Figure 1:
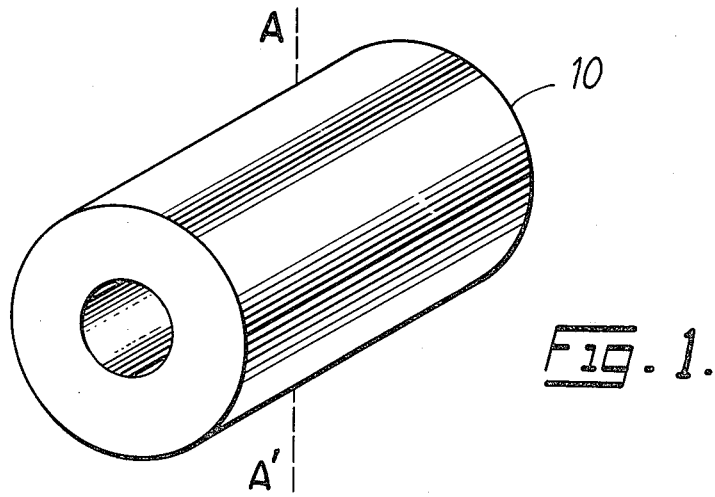

Feb. 26, 1963   J. R. JOHNSON   3,079,316
THERMALLY RESISTANT ARTICLES AND METHOD
FOR THEIR FABRICATION
Filed May 22, 1958

INVENTOR.
JAMES R. JOHNSON
BY Frank A. Steel
ATTORNEY

United States Patent Office 3,079,316
Patented Feb. 26, 1963

3,079,316
THERMALLY RESISTANT ARTICLES AND
METHOD FOR THEIR FABRICATION
James R. Johnson, White Bear Lake, Minn., assignor to Minnesota Mining and Manufacturing Company, St. Paul, Minn., a corporation of Delaware
Filed May 22, 1958, Ser. No. 736,954
7 Claims. (Cl. 204—154.2)

This invention relates to articles of manufacture comprised of siliconized silicon carbide, and to processes for their production.

This application is a continuation-in-part of my prior copending application Serial No. 657,503, filed May 7, 1957.

Siliconized silicon carbide is a substance which is known to be highly thermally resistant and to be useful in the production of articles of manufacture which are to withstand great heat. Thus, for example, the use of siliconized silicon carbide as a material for construction of heat exchangers, or as nuclear reactor fuel elements, which are designed to operate at high temperatures, would be very desirable, because this material becomes stronger as it is heated up to temperatures in the range of about 2400° F. Such fuel elements, or heat exchangers, must have relatively thin walls in order to assure high rates of heat transfer. However, it has heretofore been found to be impossible to produce useful siliconized silicon carbide articles of this nature having wall thickness less than about 1/8". This thickness is far too great to permit the use of the material for the purposes mentioned. Furthermore, the articles which have heretofore been employed in attempting to prepare objects of intricate shapes, and composed of siliconized silicon carbide, have been found to give rise to an amount of shrinkage occurring between the initial preparation and the completed article of manufacture. Dimensional precision has therefore been difficult to control. Consequently, no self-supporting structures which satisfactorily utilize the unique properties of siliconized silicon carbide in such applications have heretofore been available.

It is an object of this invention to provide a plastic, workable mass which permits the manufacture of thin-walled articles composed essentially of siliconized silicon carbide. It is another object of the invention to provide articles of manufacture which utilize the unique properties of siliconized silicon carbide as welding agent. Yet another object of the invention is to provide siliconized silicon carbide-coated amorphous carbon or graphite articles, and a method for their production. It is a still further object of the invention to provide a novel process for the production of articles of manufacture composed essentially of siliconized silicon carbide.

In accordance with the above and other objects of the invention, I have found that a plastic mass composed of finely divided carbon and silicon carbide, with a minor amount of a film-forming polymeric binder, can be formed into sheets having very thin cross sections. Such sheets can be produced with thicknesses as small as a few thousandths of an inch. A sheet thus prepared is more or less flexible and leathery and can be shaped into any desired form by cutting, dieing out, stamping, bending, or by joining sheets of appropriate configuration, and thereafter can be treated by heating in the presence of excess silicon to a temperature which is sufficient to destroy or vaporize the binder and to convert the remaining fabrication composed of silicon carbide and carbon to siliconized silicon carbide. In its broader aspect, the scope of the invention includes the use of the aforesaid plastic mass containing finely divided carbon and silicon carbide in a relatively less viscous form for the purpose of coating refractory articles, such as those made of graphite. When the articles thus coated are thereafter subjected to the action of heat in the presence of excess silicon, the coating is converted to a continuous, tightly adherent film of siliconized silicon carbide. In a still further aspect of the invention, I have found that the plastic mass heretofore described, together with silicon, can be employed as a welding agent for the purpose of joining the components of articles of manufacture made of graphite and/or amorphous carbon. These discoveries have resulted in several highly advantageous and heretofore unobtainable achievements.

By the use of my invention in its several aspects, it is possible to prepare intricate thin-walled shapes of siliconized silicon carbide which take advantage of the unique high temperature refractory nature of this substance. In this way it is possible to fabricate various articles required for operation at high temperature, as for example, nuclear reactor fuel elements, heat exchangers and the like, of siliconized silicon carbide. Furthermore, useful fabrications comprising carbon or graphite can be made using the methods of the invention. It is well known that graphite is one of the best refractories obtainable for use at high temperature, but graphite is subject to a serious disadvantage in that it becomes reactive at high temperatures and therefore may be converted to gaseous substances if it is overheated in air. However, graphite articles which have been coated with siliconized silicon carbide are much less subject to reaction on heating. The coating of siliconized silicon carbide produced by use of the plastic carbon and silicon carbide-containing mass of the invention appears to bond itself integrally to the surface of the graphite or carbon articles and no change in weight of such a coated article can be observed even when it is heated to a temperature far beyond that at which the graphite normally would disappear. The coating is very firmly attached to the surface and is not removed by thermal shock or mechanical shock which does not destroy the article itself.

Thus, it has been found that very useful canned fuel elements for nuclear reactors can be produced by encasing a suitable fissionable material in graphite, and coating the construction with siliconized silicon carbide. These may be used at temperatures up to 1400° C. and even higher, without suffering distortion or erosion from hot gases and without permitting escape of fission products. By the use of such fuel elements, the efficiency of nuclear reactors, for example, gas-cooled nuclear power plant reactors, is advantageously increased. Furthermore, the fuel elements when spent are readily recovered, for example, by crushing them to small particle size and recovering the unused fuel and fission products therefrom by known processes.

Additionally, I have found it possible to take advantage of the unique characteristics of siliconized silicon carbide in bonding intimately to the surface of graphite in a novel method for welding graphite or carbon components together. The term "welding" as used herein is to be understood as referring to the process for joining graphite or carbon articles whereby the parts are first joined with the plastic mass of the invention containing silicon carbide, carbon and a temporary binder, and then subjected to heat in the presence of an amount of silicon, producing thereby siliconized silicon carbide which forms the bonding agent in accomplishing the desired result, as disclosed herein. The bond thus produced is stronger than the graphite or carbon, and in addition has better heat conductivity than these materials.

The plastic mass which I employ in realizing the various advantages of my invention comprises a substantially homogeneous mixture of about 100 parts of finely divided carbon, 100 to 500 parts of finely divided silicon carbide, and 5 to 50 parts of a film-forming polymer.

As is well known in the art, the properties of the particular polymer used as a binder can be suitably adjusted by the addition of adjuvants such as plasticizers, solvents, wetting agents and the like. A minor amount of wetting agent is preferably added in order to facilitate the formation of a homogeneous mass, homogeneity being necessary if undesirable striations, fractures, and the like are to be avoided in the end product. Such wetting agents as alkyl ethers of polyalkylene glycols, ethyl phenyl glycol or other alkylarlylpolyether alcohols, polyoxyethylene acetate, or other polyoxyethylene esters and the like are suitable. The consistency of the plastic mass can be varied so as to be in any state from a very thick, viscous substance to a thin, paint-like material. Such variations are readily accomplished as, for example, by the introduction of one or more solvents into the polymeric binder, the amount of solvent being adjusted so that the desired consistency is achieved. Examples of solvents which are suitable are toluene, xylene, ethanol, butanol, acetone, methyl isobutyl ketone, isopropanol, diacetone alcohol, benzene and the like. The solvent which is selected in the individual case will of course depend upon the composition of the polymeric binder which is used; but the actual solvent employed is not critical since it is effectively removed by evaporation during stabilization of the fabricated plastic mass. Alternatively, where a thermoplastic resin is used in the polymeric binder, the viscosity of the plastic mass can be varied simply by heating the composition to a greater or lesser degree and where it is a 100% solids thremosetting resin, such as an epoxy-type resin, the viscosity of the plastic mass can be varied according to the composition and cure-history of the resin.

The polymer which is used in the present invention need only be characterized by its film-forming property. It is immaterial for the purpose of the present invention whether the polymeric binder vaporizes or whether it chars to carbon and ash upon heating to 3000 to 4000° F. Thus, "heating at 3000° F. to 4000° F. until the polymeric binder is eliminated" should be understood as meaning that the fabrication is heated until the polymeric binder is eliminated as a binder, regardless of whether any carbon and/or ash is left behind. Thermosetting or thermoplastic, high molecular weight plastics or elastomers can be used, e.g. poly-vinyl-type resins such as poly-vinyl chloride, polystyrene, polymethyl methacrylate, polyvinyl acetate, polyvinyl laurate, polyvinyl stearate, polyethyl acrylate, polyoctadecyl acrylate, polyoctadecyl methacrylate, polyvinyl ethyl ether, polyvinyl butyl ether, polyvinyl isobutyl ether, polyvinyl octyl ether, polyvinyl 2-chloroethyl ether, and the like, polyesters such as polydiethylene glycol adipate, polyethylene glycol terephthalate, poly-propylene glycol suberate, poly-diethylene glycol suberate, poly-1,4 butylene glycol sebacate, poly-ethylene glycol maleate, poly-2,2 dimethyl 1,3 propane-diol adipate, poly-propylene glycol adipate, poly-diethylene glycol azeleate, and the like, polyesters cross-linked with diisocyanates, phenol-formaldehyde resins, epoxy resins, melamine resins, urea-formaldehyde resins, polyethylene, fluorinated alkyl acrylate-type resins such as poly-1,1-dihydroperfluorobutyl acrylate, poly-1,1-dihydroperfluorooctyl methacrylate, and the like, poly-tetrafluoroethylene, polychlorotrifluoro ethylene, polyhexafluoropropene, vinylidene fluoride, copolymers of the monomers of the above (and other) resins, elastomers such as poly-styrene-butadiene (GRS rubber), nitrile rubbers, chloroprene rubbers, butyl rubbers, and the like.

Alternatively to the use of already-formed polymers, it will be obvious that polymers or copolymers can be formed in situ in the plastic mass by mixing appropriate amounts of monomers with the carbon and silicon carbide, and initiating polymerization in the mixture.

As noted hereinabove, it is expedient to utilize a plasticizer with certain resin systems in order to improve the flexibility and workability of the solvent-free film. With other resin systems, no plasticizer is ordinarily needed, and in fact some polymers may be said to be internally plasticized (e.g. polyacrylate esters of long-chain alcohols).

The components of the mixture, such as any wetting agent, plasticizer, solvent and polymer or other materials used in the polymeric binder should, of course, be compatible.

In order to produce a homogeneous, fine-grained, non-porous article capable of accomplishing the objects of the present invention, it has been found that the carbon and silicon carbide particles in the plastic mass should not be more than about 50 microns in diameter and the term "finely divided" as used herein carries this limitation. If coarser fillers are used, for example, the non-porous property of the final article, which makes it possible to maintain coated carbon or graphite articles at high temperatures for indefinite periods without appreciable corrosion by oxidation, is lost.

In addition to the constituents set forth hereinabove, other substances which are not adversely affected by the temperatures later used for siliconizing can be incorporated with the plastic mass for accomplishing specific purposes. Thus, for example, uranium dioxide in amount up to about 50%, based on the total amount of solids, can be added before fabrication.

For the preparation of articles of manufacture, the plastic mass which has been adjusted to a suitable viscosity is preferably spread in a film or layer of suitable thickness, preferably of uniform thickness over the entire area, and conveniently upon a backing surface to which it does not adhere, and which is not adversely affected by any solvent which may be contained in the plastic mass. This backing or supporting surface may be of any impervious non-porous material such as polytetrafluoroethylene, poly-ethylene glycol terephthalate, cellulose acetate, cellophane (regenerated cellulose), and the like.

The plastic mass is then stabilized in this form, by heating the plastic mass until it is solid if a 100% solids polymeric binder has been used, by permitting the solvent to evaporate if a solvent has been used or, if a thermoplastic material has been used, by permitting the film to cool. A stabilized sheet results, which can be stripped from the backing whenever desired. (Alternatively, where the backing or supporting surface is composed of a polymeric film or the like which is eliminated under the temperature conditions to which the stabilized configuration is later subjected as set forth hereinafter, the backing need not be removed.) The resulting stabilized sheet retains considerable flexibility, and can be cut, stamped or died out, or otherwise formed into any desired shape by the usual methods, consideration of course being given to the relatively fragile nature of the very thin films which can be employed. To strengthen such thin films, they can be corrugated or shaped into other configurations which have a stiffening effect, as by dimpling or embossing. If the final product is to be formed of several joined parts, the component parts are cemented together using the plastic mass hereinabove described as a cement or bonding agent. Alternatively, the plastic mass may be formed by extrusion, without loss of the advantageous absence of shrinkage and consequent adherence to predetermined dimensional tolerances. The article thus fabricated is placed in a suitable furnace, or is heated by other means, to a temperature in the range of about 3000° to 4000° F. (in a carbon-inert atmosphere such as in helium if desired), in the presence of an excess of silicon. The term "an excess of silicon" is used herein to mean a sufficient amount of silicon to form silicon carbide with the finely divided carbon in the structure left upon elimination of the temporary polymeric binder and to fill any voids in the thus-formed silicon carbide structure, so that impervious, dense, gas-proof siliconized silicon carbide is formed. The amount of silicon used may vary within moderate limits, depending on the amount of free carbon present, the size of the particles of which the article is composed, and when used in coating or welding of parts as described herein, the porosity of the article. Inspection after completion of the process shows whether a sufficient amount of silicon has been used. Insufficient silicon leaves voids or imperfections, while a too great excess may cause undesirable surface roughness. At the stated temperature, the resin is vaporized or destroyed as a binder almost immediately and the silicon is melted. The destruction of the binder has left the prefabricated shape in the form of an intermediate structure containing carbon and silicon carbide, and the silicon which has melted infiltrates this body and reacts with the carbon contained therein to form more silicon carbide. Furthermore, all of the silicon carbide particles are wetted with molten elemental silicon. The siliconizing process thus performed requires about 30 to 60 seconds for completion. In comparison with the siliconizing processes of the prior art, which are completed in a very much shorter time and with a certain amount of mechanical shock to the fabricated article, the process of the application is relatively gentle. Thus, there is substantially no mechanical stress imposed on the fabricated shape during siliconizing by the process of the invention. Further, the slower reaction minimizes any tendency toward inclusion of gases and consequent voids in the finished product. A particular advantage which resides in this aspect of the invention results from the fact that no dimensional change or warpage occurs during the siliconizing process. Thus it is possible by using a 100% solids polymeric binder such as an epoxy resin, to prefabricate the plastic mass in essentially the dimensions which are desired in the final product. The result is an impervious article of manufacture comprised of a two-phase mixture of silicon carbide and silicon, i.e., siliconized silicon carbide.

In the coating of refractory graphite surfaces or the like, a procedure similar to that above described is followed, except that a thinner or less viscous plastic mass is prepared, which is spread in a film which may be of substantially uniform thickness over the surface to be coated. However, the film may be made thicker or thinner at will in areas which require more or less protection. Variations in the viscosity of the plastic mass are readily accomplished, as, for example, by the introduction of one or more solvents into the polymeric binder, the amount of solvent being adjusted so that the desired viscosity is achieved. Examples of solvents which are suitable are toluene, xylene, ethanol, butanol, acetone, methyl isobutyl ketone, isopropanol, diacetone alcohol, benzene and the like. The solvent which is selected in the individual case will of course depend upon the composition of the polymeric binder which is used; but the actual solvent employed is not critical since it is effectively removed, as by evaporation, after the graphite-encased fuel element has been coated. Alternatively, where a thermoplastic resin is used in the polymeric binder, the viscosity of the plastic mass can be varied simply by heating the composition to a greater or lesser degree and where it is a 100% solids thermosetting resin, such as an epoxy-type resin, the viscosity of the plastic mass can be varied according to the composition and cure-history of the resin. Any solvent which may be present is evaporated, or the coating may be otherwise stabilized, as set forth hereinabove in connection with the fabrication of articles from the plastic mass or mixture, and the article is then placed in a suitable furnace and in the presence of elemental silicon, and is rapidly heated to a temperature in the range above specified, preferably in an inert atmosphere as hereinabove set forth. It will be apparent that the furnace may be preheated to the desired temperature, and the coated article and silicon may be introduced therein together. A uniformly coated article results; that is, an external, continuous, impermeable film of siliconized silicon carbide is formed on the surfaces thus coated. It has been found that such coatings upon graphite are exceedingly tenaciously held and cannot be removed mechanically therefrom.

Broadly speaking, canned fuel elements of the invention are produced as follows: A container of any desired shape and size, having a cavity formed therein for reception of the metallic or other fissile fuel, is produced by the usual means from amorphous carbon or graphite; for example, it can be turned on a lathe from a block or rod; or alternatively, a container can be formed by compressing powdered graphite and a binder, e.g. pitch, into the desired form, followed by carbonizing the binder. A lid or cover is similarly provided for the cavity in the container. The fuel is inserted in the cavity, the lid is placed thereon and affixed, for example by the use of complementary screw threads formed in the cooperating parts; or, even more conveniently, by cementing the cover to the body of the container with some of the plastic mass to be used for coating, as described hereinafter with respect to welding or cementing of graphite parts. The container is then coated with the plastic mass comprising a mixture of finely divided carbon, silicon carbide, and temporary binding agent, as described hereinabove. The coating is thereafter converted to siliconized silicon carbide by the process of the invention. For application, the coating mixture is conveniently suspended in a liquid vehicle, which is evaporated or otherwise removed before conversion of the coating to siliconized silicon carbide. In an alternative form, a graphite matrix may be formed, which contains grains or pellets of fissile or fertile uranium, thorium, plutonium or the like nuclear fuel, the said matrix being shaped into any desired form, such as spheres, cylinders, blocks and the like. The exterior of the matrix is then coated with the mixture of finely divided carbon, finely divided silicon carbide and temporary binder, as set forth above. The article thus fabricated is placed in a suitable furnace, or is heated by other means, to a temperature in the range of about 3000 to 4000° F., preferably in a carbon-inert atmosphere such as helium, and in the presence of an excess amount of silicon. At this temperature, and in the presence of the then molten silicon, the polymeric temporary binder evaporates or is otherwise effectively removed, and a uniform, impervious layer of siliconized silicon carbide is formed from the mixture of carbon and silicon carbide which remains upon the surface of the canned fuel element. As stated hereinabove, in the production of the siliconized silicon carbide, the molten silicon infiltrates the coating which was placed upon the surface of the graphite article, thereby producing an impermeable surface layer. At the same time, the silicon flows into the joint to accomplish the cementing of the lid to the body of the container, if a multi-part construction has been utilized. A canned fuel element is thus produced, and the graphite in which the nuclear fuel is embedded or encased, acts as a moderator and replaces a portion of the graphite which would ordinarily be required for this purpose.

When used as a thermally activated cement or welding agent for joining graphite components, the plastic mass is coated on at least one of the surfaces to be joined in a thin, uniform film. The surfaces to be joined are then brought into juxtaposition, while the coating is still in a condition where it will wet and adhere to itself or the other surface; i.e. before stabilization. The solvent, if any is present, is then evaporated; or the composition if thermoplastic is cooled; or further, if the composition is thermosetting, it is conveniently heated until set. The joints thus made generally are self-supporting in the further treatment thereof. Obviously where complicated shapes are involved, the parts may be held in position, as with a jig or by other convenient means. The joint thereafter is heated in an inert atmosphere and in the presence of elemental silicon to a temperature sufficient to melt the silicon and drive off the resin. The elemental silicon flows into the joint and the resulting siliconized silicon carbide makes a gas tight seal between the parts to be joined which is stronger than the graphite itself.

The following specific examples, which are intended only to be illustrative and not limiting in any sense, will serve to describe specific applications of the invention. All parts are by weight.

EXAMPLE 1

*Preparation of Fabricated Articles Having Thin Cross Sectional Dimensions*

A plastic mixture is prepared consisting of 39.4 parts of polyvinyl butyral (which may be obtained under the trade name "Butvar" from the Shawinigan Resin Corporation), 15.8 parts of a polyalkylene glycol plasticizer, 3.5 parts of "Tergitol" (a wetting agent sold by Carbide and Carbon Chemicals Company which contains lower alkyl ethers of polyethylene glycol), 33 parts of micronized graphite (particle size 2 to 10 microns, available from the Dixon Crucible Co.), 67 parts of 325 mesh coke, 33 parts of 600 mesh silicon carbide and 200 parts of 1000 mesh silicon carbide. A sufficient amount of toluene is added to make the mixture substantially liquid. Mixing is continued until the mixture is substantially homogeneous, and then a thin film is prepared by knife-coating the plastic mixture on a sheet of a polymer such as polyethylene terephthalate to a thickness of three thousandths of an inch. The film thus prepared is warmed slightly to evaporate the toluene therefrom. A plastic film is obtained containing carbon, silicon carbide and the resin mixture described. It does not adhere to the polymer sheet, and can easily be stripped off, yielding the film in a sufficiently workable condition to permit the fabrication of substantially any shape therefrom. Alternatively, the film can be stored for any desired length of time, before or after stripping from the supporting sheet, before use. When the desired configuration of the article has been prepared, utilizing the wet mixture as a cement if several component parts thereof are to be joined together, the prefabricated article and a quantity of silicon are placed in a preheated graphite resistance furnace operating at a temperature of about 3500 to 4000° F. After a few seconds of heating, the plastic mixture disappears leaving a shape composed of the initial carbon and silicon carbide in the basic mixture. The silicon melts and infiltrates the carbon-silicon carbide structure. The molten silicon reacts with the elemental carbon, whereupon silicon carbide is formed in situ, and furthermore the molten silicon infiltrates and surrounds all the particles of silicon carbide, a sufficient amount of silicon having been added initially to accomplish this purpose. After cooling, the article is removed from the furnace and is found to have considerable strength when cold.

The same procedure is followed, increasing the thickness of the knife-coated film up to thirty thousandths of an inch, to produce equally useful, but correspondingly thicker, films and articles prepared from such films.

EXAMPLE 2

Articles similar to those in Example 1 are prepared from a plastic mixture of 37 parts of polyvinyl ether, 100 parts of carbon and 233 parts of silicon carbide (the individual particles of carbon and silicon carbide being smaller than 325 mesh).

Other resins which are suitable for use in the plastic mix are polyvinyl chloride, polymethyl methacrylate and polyvinyl isobutyl ether.

EXAMPLE 3

*Welding of Graphite and Carbon Articles*

A plastic mixture is prepared which consists of 24.8 parts of polyvinyl butyral, 10.0 parts of a polyalkylene glycol plasticizer, 2.2 parts of "Tergitol" wetting agent, 33 parts of micronized graphite, 67 parts of 325 mesh coke, 33 parts of 600 mesh silicon carbide and 200 parts of 1000 mesh silicon carbide. Toluene or xylene is added until the mixture is substantially liquid. The mixture is placed in a tumbler mill for 24 hours, at the end of which time it is substantially homogeneous. This mixture may then be used to "weld" together components of articles of manufacture made of graphite and/or amorphous carbon. One or both of two surfaces which are to be welded together are coated with the plastic mixture and are brought together. A jig may be used if desired to maintain the two parts in the proper relative position. The parts are then placed in a resistance furnace operating at a temperature of 3500° to 4000° F. and which contains a previously added, excess amount of elemental silicon, preferably with the joint in contact with the molten silicon. The structure is removed from the oven after a dwell time of between 30 seconds and one minute. The parts are found to be joined together by a dense non-porous bond which is stronger than the parts themselves.

Similar results can also be obtained using plastic mixtures which contain phenol-formaldehyde resins, melamine resins or urea formaldehyde resins.

EXAMPLE 4

*Coating of Graphite or Amorphous Carbon Articles*

The plastic mixture of Example 3 can also be used to coat carbon or graphite parts, the viscosity of the mixture being adjusted to a creamy consistency by the addition of a solvent. The coatings can be applied by brush, roll, spray, dip, or any other convenient technique. They can be applied in a single layer or in several layers, and either evenly over the entire surface of the article or in varying thicknesses. Thus a thicker coating can be applied in an area where extreme wear or erosion, as by hot gases, will be encountered by the finished part. The coated articles are placed in an oven which is operating at between 3500 and 4000° F. and to which a charge of silicon metal has just previously been added. After a dwell time of between 30 seconds and one minute in the oven, the articles are removed. They are found to be covered with a siliconized silicon carbide coating, which is sufficiently dense and non-porous to eliminate erosion of the part by oxygen at very high temperatures. In addition, it is found that no dimensional change or warpage has occurred during the siliconizing.

Figure 2:
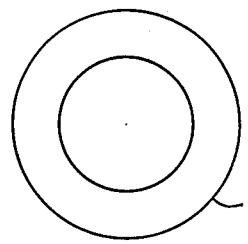
Figure 3:
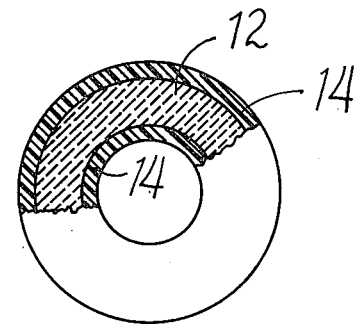
Figure 4:
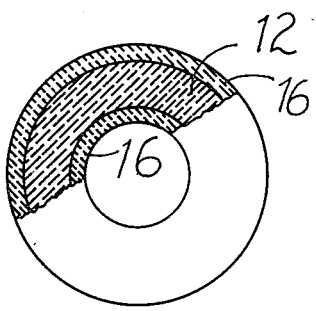

A graphite tube about ½ inch in diameter and 2½ inches long, intended for use as a connecting element for conducting high temperature oxygen-containing gases, is substantially uniformly coated over its entire internal and external surfaces with a plastic mixture as described. The solvent is permitted to evaporate, with gentle heating, and the tube, having the resulting stabilized layer on its surfaces, is placed in a furnace operating at about 3500° F., together with an excess of silicon. After about 30 seconds, at this temperature, the coating is completely siliconized and the tube is removed from the furnace. After cooling, the tube is found to be covered with a dense, tightly adherent gas-proof coating of siliconized silicon carbide. The invention as it relates to coated articles of graphite or carbon will be further illustrated by reference to the appended drawing, in which FIG. 1 represents a carbon tube having a continuous, gas impermeable coating of siliconized silicon carbide over its entire exterior surface; FIG. 2 represents an end view of the carbon tube; FIG. 3 is a cross-sectional view taken along line A, A' of FIG. 1, showing the coated tube before siliconizing; and FIG. 4 shows the same cross-section after siliconizing.

In the drawing, the surface-coated tube in FIG. 1 is designated 10. In FIG. 2, carbon tube 12 is shown in end view before coating and its shape and dimensions are to be noted. In FIG. 3, carbon tube 12 is shown in cross-section coated with an unfired stabilized superimposed coating 14 consisting of silicon carbide, carbon and a synthetic resin binder. FIG. 4 shows the same cross-section after firing, whereupon coating 14 is transformed to a siliconized silicon carbide coating 16 adhered to tube 12, forming a superimposed gas-impermeable, continuous, layer. The dimensions of tube 12 remain unchanged, while as shown the coating 16 overlies the original surface and increases the external dimensions of the article.

EXAMPLE 5

*Preparation of a Nuclear Reactor Fuel Element*

Two lots of plastic mix are prepared. The first contains 39.4 parts of polyvinyl butyral, 15.8 parts of polyalkylene glycol plasticizer, 3.5 parts of "Tergitol" wetting agent, 33 parts of micronized graphite (particle size 2 to 10 microns, available from the Dixon Crucible Co.), 67 parts of 325 mesh coke, 33 parts of 600 mesh silicon carbide and 200 parts of 1000 mesh silicon carbide. The second lot of plastic mix contains approximately the same relative amounts of the same constituents as the first lot and, in addition, not more than about 400 parts of uranium oxides, uranium carbides, or uranium silicides or a combination of them. Sufficient solvent is added to both lots to render them substantially liquid and both are mixed until they are homogeneous. A thin film of the first lot is knife coated on a sheet of a polymer such as polyethyleneterephthalate, to which the mix will not adhere when it is solidified. The solvent is evaporated and a thin film of the second lot is knife coated over the first film. This film is in turn dried and then a third layer of the first lot is coated over the first two and it is also dried. This sandwich construction, which can be stripped from the supporting film, forms the basic material for the fabrication of shapes for nuclear fuel reactor elements.

Other resin systems, which can be used in place of the polyvinyl butyral in the preparation of the plastic mixture of this example as a temporary binder for the carbon and silicon carbide, are polyesters cross linked with diisocyanates, phenolformaldehyde resins, polyethylene, fluorinated alkyl acrylates, polystyrenebutadiene copolymers, nitrile rubbers and butyl rubbers.

EXAMPLE 6

*Preparation of a Nuclear Reactor Fuel Element Canned in Graphite and Coated With Siliconized Silicon Carbide*

A container body is formed by boring a hole in a graphite cylinder 1" in diameter and 2" long on a longitudinal axis thereof, maintaining the walls of the cavity thus formed of a uniform thickness of approximately ⅛". A cover for the cylinder is provided by making a graphite disc of the same diameter as the cylinder, having a shoulder which fits closely into the cavity. A length of uranium oxide rod of such diameter as to be an easy fit in the cavity is inserted therein. The abutting edges of the cover and body portion of the container are coated with a mixture of finely divided silicon carbide and carbon in a liquid vehicle containing a temporary binder, prepared as set forth in Example 3 and adjusted to a paint-like consistency as in Example 4. The cover is placed on the container while the coating is still wet. The exterior of the container is then covered with a substantially uniform layer of the same coating material, by brushing on an even coat.

The solvent is permitted to evaporate from the coating until substantially dry. The coated cylinder is then placed in an electric resistance furnace preheated to a temperature of 3500 to 4000° F., together with an excess amount of elemental silicon. The amount of silicon employed is not critical, so long as it is in excess of the amount needed to siliconize the entire coating. For example, for each square inch of surface area coated to a thickness of approximately 3 mils (after drying the coating but before firing), a total amount of approximately .04 g. of carbon is present in finely divided form in the film on the exterior surface of the container. About 1 g. of elemental silicon for each square inch of surface area will be sufficient to provide an excess of silicon in this instance. The elemental silicon is introduced into the furnace in the form of large or small crystals, or even in one piece, inasmuch as the silicon melts at furnace temperature and infiltrates the carbon-silicon carbide coating. Desirably, the silicon is placed in the furnace in such a way that it contacts the article to be treated. The molten silicon reacts with the elemental carbon, forming silicon carbide in situ. Furthermore, the molten silicon infiltrates and surrounds all of the particles of silicon carbide thus formed. The article is allowed to remain in the furnace for a period of about 30 to 60 seconds. In the initial few seconds of heating, the plastic binder disappears from the coating, leaving only the carbon and silicon carbide. The remainder of the siliconizing process than proceeds as set forth above.

After cooling, it is found that the container is covered with a uniform, dense, gas-impervious film of siliconized silicon carbide. When employed as a fuel element in a nuclear reactor, it is found that operating temperatures up to about 1400° C. can be employed. The fuel element is extremely resistant to erosion by hot gases, while the graphite does not change in weight or evaporate, even though maintained at temperatures of 1400° C. for a period of time as long as 10,000 hours or more.

EXAMPLE 7

A spherical nuclear fuel element is prepared as follows (the concentric layers being of such dimensions that they fit together somewhat loosely):

A spherical shell is produced by lathe-turning a graphite cylinder approximately 2 inches in diameter to form two hollow hemispheres, having a wall thickness of approximately ⅛ inch, outside diameters of about 1¼ inches and inside diameter of about 1 inch. The mating edges of the hemispheres are provided with cooperating shoulders. As a fuel element to be contained within the spherical shell, two hollow hemispheres of uranium oxide are prepared having inside diameters of about ¾" and outside diameters of about 1 inch. A spherical graphite core having a diameter of about ¾ inch is prepared and placed inside of the hollow uranium oxide shell formed by mating the two hollow hemispheres of uranium oxide. The spherical uranium oxide-carbon assembly is then placed within the graphite hemispheres, the abutting edges of which have been coated with a plastic mixture prepared as set forth in Example 3, just prior to joining the two halves. After evaporation of the solvent from the joint thus made, so as to provide a degree of mechanical strength, the sphere is dipped into a mixture of the composition set forth in the Example 3, to which a sufficient amount of toluene has been added to render the viscosity of the mixture similar to that of heavy cream. The sphere is removed, placed on a suitable surface and allowed to drain. During draining, the sphere is rotated from time to time so that a substantially uniform layer of the plastic mixture will be coated over the entire surface. The solvent is allowed to evaporate, and the coating thus formed becomes substantially dry. The portion of the coating which has contacted the supporting surface is then inspected to see whether any imperfections in the film exist and if so, they are remedied by brushing on a suitable quantity of the plastic mixture. After the coating is substantially dry, the sphere is placed in a resistance furnace, which is electrically heated and operating at a temperature between about 3500 and 4000° F. Simultaneously, a charge of an excess amount of elemental silicon is placed in the furnace, and the sphere is permitted to remain in the furnace for about 45 seconds. During this time, the binder is effectively removed from the coating and the silicon melts and infiltrates the remaining portion of the film on the surface of the graphite sphere. A siliconized silicon carbide coating is formed over the entire surface of the sphere. After removal from the furnace and cooling, the container is ready for use as a fuel element nuclear power reactor.

EXAMPLE 8

A spherical matrix of graphite and uranium oxide is prepared by mixing about 75 parts of micronized graphite, about 10 parts of powdered (100 micron) uranium oxide and about 16–18 parts of petroleum pitch until the mixture is substantially homogeneous, pressing the mixture into a 1 inch diameter sphere and heating at slowly increasing temperatures until a temperature of 1000° C. is reached after about 24 hours. At this time the heating is terminated, the organic matter in the petroleum pitch having been reduced to carbon. The resulting hard, dense sphere is then coated by dipping as set forth in Example 7. After the intermediate coating of silicon carbide, carbon and binder has dried, the sphere is placed in a furnace heated to about 3500° F. together with a sufficient quantity of elemental silicon to provide an excess of silicon for siliconizing the coating. The sphere is permitted to remain in the furnace for about 45 seconds. It is then removed, and is found to have on the surface thereof a substantially impervious, uniform coating of siliconized silicon carbide.

EXAMPLE 9

A canned fuel element for a nuclear power reactor employing cylindrical rods is prepared as follows: a graphite tube about 1½ inches in diameter and having a wall thickness of about ⅛ inch is cut to a length of about 6 inches and the ends of the tube are accurately turned to be flat and at 90° with the longitudinal axis. A pair of caps are prepared for the tube, by turning discs 1½ inches in diameter, provided with a shoulder which enters into and is a close fit in the bore of the tube. An uranium oxide rod of such diameter and length as to be a slightly loose fit (e.g. .002″ clearance) in the tube when it is capped at both ends is then inserted into the bore, the edges of the discs are coated with a plastic mixture prepared as set forth in Example 3, and the discs are applied to the ends of the tube. The tube is then provided with a substantially uniform coating of the mixture described in Example 3, to which a sufficient amount of toluene has been added to make it of brushing consistency. The mixture is applied with a brush, and the coating is allowed to dry tack-free. Thereafter, the coated tube is placed in a furnace preheated to 3750° F., in contact with an excess amount of molten silicon, for 45 seconds. When cooled, the fuel element is suitable for use as one of the several fuel rods in a gas-cooled reactor.

When large excess amounts of silicon are used in the siliconizing step of the process, surface roughness may be evident because of the accumulation of drops or irregular mounds of silicon. These are readily removed from the fuel elements or other constructions of the invention by grinding, using a silicon carbide grinding wheel.

What is claimed is:

1. A canned fuel element for nuclear reactors, comprising a fissionable fuel contained within a closed graphite can therefor, said can being coated over its entire exterior surface with an external, superimposed, discrete, gas-impervious two-phase coating of siliconized silicon carbide which is adhered to the original surface of the said graphite can, whereby the said can is rendered resistant to high temperatures and to erosion caused by hot gases.

2. An article of manufacture composed essentially of carbon and having a relatively thin, discrete, superimposed, continuous, gas-impermeable external coating of silicon carbide which is adhered to the original surface of the carbon article.

3. A fuel element for nuclear reactors, comprising a fissionable material contained in carbon and the said fuel element having a relatively thin, continuous, discrete, superimposed gas-impervious two-phase external coating of siliconized silicon carbide which is adhered to the entire original external carbon surface thereof.

4. A fuel element for nuclear reactors, comprising a fissionable fuel in admixture with graphite and having a relatively thin, discrete, superimposed, continuous gas-impermeable two-phase external coating of siliconized silicon carbide which is adhered to the original external surface of the graphite, the silicon phase filling voids occurring in the silicon carbide phase of said coating.

5. An article of manufacture composed essentially of carbon and at least a portion thereof being firmly bonded to a relatively thin, discrete, external, superimposed, continuous gas-impermeable film of siliconized silicon carbide which is adhered to the original surface of the carbon.

6. An article of manufacture composed essentially of carbon and having a relatively thin, discrete, superimposed, continuous gas-impermeable external coating of siliconized silicon carbide over at least a portion of the surface thereof, which is adhered to the original surface of the carbon.

7. A fuel element for nuclear reactors, comprising a discrete relatively thin sheet of a fissionable fuel in admixture with siliconized silicon carbide laminated between and integrally bonded to discrete, relatively thin, continuous, superimposed gas-impermeable sheets of siliconized silicon carbide, which are adhered to the original surface of the sheet of fissionable fuel.

References Cited in the file of this patent
UNITED STATES PATENTS

| | | |
|---|---|---|
| 876,330 | Clark | Jan. 14, 1908 |
| 876,331 | Clark et al. | Jan. 14, 1908 |
| 1,853,370 | Marshall | Apr. 12, 1932 |
| 2,109,485 | Ihrig | Mar. 1, 1938 |
| 2,431,326 | Heyroth | Nov. 25, 1947 |
| 2,614,947 | Heyroth | Oct. 21, 1952 |
| 2,798,848 | Kingdon | July 9, 1957 |
| 2,799,642 | Hurwitz et al. | July 16, 1957 |
| 2,814,857 | Duckworth | Dec. 3, 1957 |
| 2,816,844 | Vellamy | Dec. 17, 1957 |
| 2,860,999 | Veltz el al. | Nov. 18, 1958 |
| 2,907,705 | Blainey | Oct. 6, 1959 |
| 2,910,379 | Gurinsky | Oct. 27, 1959 |
| 2,990,351 | Sanz et al. | June 27, 1961 |

FOREIGN PATENTS

| | | |
|---|---|---|
| 494,463 | Italy | May 25, 1955 |
| 754,559 | Great Britain | Aug. 8, 1956 |

OTHER REFERENCES

Powell: "Vapor-Plating," John Wiley and Sons Inc., New York, 1955, pages 72, 73.

Nucleonics, March 1956, pp. 34–44, AEC Document TID–7530 (pt. 1), Ceramic Intf. Meeting, Oct. 1, 2, and 3, 1956, pp. 2–13, in particular p. 3.